US011892622B1

(12) United States Patent
Yan

(10) Patent No.: US 11,892,622 B1
(45) Date of Patent: Feb. 6, 2024

(54) LIGHT-EMITTING DIODE (LED) FOUNTAIN LIGHT WITH SELF-CLEANING LENS

(71) Applicant: CHONGQING XINYUANHUI OPTOELECTRONICS TECHNOLOGY CO., LTD., Chongqing (CN)

(72) Inventor: Gangqiang Yan, Chongqing (CN)

(73) Assignee: CHONGQING XINYUANHUI OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 18/254,890

(22) PCT Filed: Dec. 31, 2020

(86) PCT No.: PCT/CN2020/141963
§ 371 (c)(1),
(2) Date: May 30, 2023

(87) PCT Pub. No.: WO2022/141346
PCT Pub. Date: Jul. 7, 2022

(30) Foreign Application Priority Data

Dec. 29, 2020 (CN) .......................... 202011592215.9

(51) Int. Cl.
| G02B 27/00 | (2006.01) |
| F21V 33/00 | (2006.01) |
| F21V 31/00 | (2006.01) |
| B08B 1/00 | (2006.01) |

(Continued)

(52) U.S. Cl.
CPC .......... G02B 27/0006 (2013.01); B05B 17/08 (2013.01); B08B 1/005 (2013.01);
(Continued)

(58) Field of Classification Search
CPC ..... G02B 27/0006; B05B 17/08; B08B 1/005; B08B 1/02; B08B 13/00; F21V 31/005;
(Continued)

(56) References Cited

U.S. PATENT DOCUMENTS

| 6,652,348 B2 * | 11/2003 | Yen .......................... B05B 17/08 446/159 |
| 7,427,036 B2 * | 9/2008 | Skluzacek ............... B05B 17/08 239/18 |

(Continued)

FOREIGN PATENT DOCUMENTS

| CN | 109958929 A | 7/2019 |
| CN | 111076128 A | 4/2020 |

(Continued)

*Primary Examiner* — Tsion Tumebo
(74) *Attorney, Agent, or Firm* — Bayramoglu Law Offices LLC

(57) ABSTRACT

A light-emitting (LED) fountain light with a self-cleaning lens includes a light body with a central hole, a light housing surrounding the light body, a nozzle provided in the light housing and located in the central hole, a central hole pressing ring sleeved in the central hole, LED light beads arranged between the central hole pressing ring and the light housing and sealed by a sealant, a driving mechanism provided between the nozzle and the central hole pressing ring, a cleaning mechanism provided on a surface of the light body to scrape off algae and other dirt, and a transmission mechanism provided between the driving mechanism and the cleaning mechanism. In the LED fountain light, scrapers are rotated forward and backward once to effectively clean the algae and other dirt on the surface of the LED fountain light.

18 Claims, 8 Drawing Sheets

(51) Int. Cl.
*B08B 13/00* (2006.01)
*B05B 17/08* (2006.01)
*B08B 1/02* (2006.01)
*F21Y 105/18* (2016.01)
*F21W 121/02* (2006.01)
*F21Y 115/10* (2016.01)

(52) U.S. Cl.
CPC ............... *B08B 1/02* (2013.01); *B08B 13/00* (2013.01); *F21V 31/005* (2013.01); *F21V 33/00* (2013.01); *F21W 2121/02* (2013.01); *F21Y 2105/18* (2016.08); *F21Y 2115/10* (2016.08)

(58) Field of Classification Search
CPC . F21V 33/00; F21W 2121/02; F21Y 2105/18; F21Y 2115/10
See application file for complete search history.

(56) References Cited

U.S. PATENT DOCUMENTS

| | | | | |
|---|---|---|---|---|
| 8,167,446 B2 * | 5/2012 | Wesselmeier | ........... | F21V 31/04 362/101 |
| 2002/0179728 A1 * | 12/2002 | Beidokhti | ............... | B05B 17/08 239/20 |
| 2006/0243819 A1 * | 11/2006 | Beidokhti | ............... | B05B 17/08 239/18 |

FOREIGN PATENT DOCUMENTS

| | | |
|---|---|---|
| CN | 210373233 U | 4/2020 |
| CN | 111350997 A | 6/2020 |
| CN | 211925482 U | 11/2020 |
| KR | 20200035764 A | 4/2020 |

\* cited by examiner

LIGHT-EMITTING DIODE (LED) FOUNTAIN LIGHT WITH SELF-CLEANING LENS

CROSS REFERENCE TO THE RELATED APPLICATIONS

This application is the national phase entry of International Application No. PCT/CN2020/141963, filed on Dec. 31, 2020, which is based upon and claims priority to Chinese Patent Application No. 202011592215.9, filed on Dec. 29, 2020, the entire contents of which are incorporated herein by reference.

TECHNICAL FIELD

The present disclosure relates to a light-emitting diode (LED) fountain light and in particular to an LED fountain light with a self-cleaning lens.

BACKGROUND

LED fountain lights are underwater lights manufactured using LED technology. Compared with traditional underwater lights, LED underwater lights are widely used in various lighting systems because they are more energy-saving, more environment-friendly, capable of creating a more colorful display, and more decorative. To create a better viewing atmosphere, many landscape scenes combine fountains and LED lights, but many problems arise therefrom. For example, the surface of the LED light is prone to grow too many algae. Since algae reproduce quickly, the lighting effect is seriously affected. It is not convenient to remove algae as conventional ways like rags and sponges are not able to remove algae effectively. Moreover, algae are prone to grow repeatedly, and brushes are not able to remove the algae and dirt on the surface of the LED lights. Algae can usually only be removed with a scraper. However, underwater LED lights with nozzles are placed under the complex underwater environment for a long time, which makes manual cleaning extremely inconvenient. Chinese patent application CN109958929 proposes a self-cleaning LED fountain light. The cleaning brush of the self-cleaning LED fountain light is driven by a conical shell to rotate, and the conical shell is driven by a driving mechanism to rotate. However, the water jetted from the bottom of the nozzle presses the conical shell against the mounting shell, making it difficult for the cleaning brush to rotate. In addition, as mentioned above, the lens of the LED fountain light cannot be cleaned thoroughly by the cleaning brush. To sum up, algae and dirt on the surface of the LED fountain light in the prior art cannot be effectively cleaned.

SUMMARY

Given this, an objective of the present disclosure is to provide an LED fountain light with a self-cleaning lens. The present disclosure solves the problem that algae and other dirt on the surface of the LED fountain light in the prior art cannot be effectively cleaned.

To achieve the above objective, the present disclosure adopts the following technical solution:

The LED fountain light with a self-cleaning lens includes a light body with a central hole, a light housing surrounding the light body, a nozzle provided in the light housing and located in the central hole, a central hole pressing ring sleeved in the central hole, LED light beads arranged between the central hole pressing ring and the light housing and sealed by a sealant, a driving mechanism provided between the nozzle and the central hole pressing ring, a cleaning mechanism provided on a surface of the light body to scrape off algae and other dirt, and a transmission mechanism provided between the driving mechanism and the cleaning mechanism. The LED light beads are annularly arranged around the central hole. The lens is annularly provided above the upper surface of each of the LED light beads.

The driving mechanism includes a sleeve fixedly provided between the nozzle and the central hole pressing ring, a power slider provided in the sleeve and slidable up and down, and a counterweight provided in the sleeve and cooperating with the power slider. The sleeve is longitudinally divided into an inner chamber adjacent to the central hole and an outer chamber adjacent to the central hole pressing ring. The power slider and the counterweight are respectively arranged in the inner chamber and the outer chamber. The power slider and the counterweight are connected through a flexible rack or toothed chain; the power slider has a weight greater than the weight of the counterweight. The bottom of the inner chamber where the power slider is located is provided with a water inlet hole for injecting a high-pressure water flow.

The central hole pressing ring is provided with a ring cover at the top of the central hole. The cleaning mechanism includes multiple scrapers arranged on the surface of the light body to scrape off algae and other dirt, multiple scraper supports configured to fix the scrapers respectively, multiple scraper holders configured to fix the scraper supports respectively, and a rotatable internal gear ring provided on the ring cover. The internal gear ring is coaxial with the central hole pressing ring. The multiple scraper holders are uniformly arranged in an array on the upper surface of the internal gear ring, and the scrapers are provided along a radial direction of the lens.

The transmission mechanism is composed of a gear set and a gear box. The gear set includes a main gear, a fixed gear coaxial with the main gear, a deflection gear, an end face gear meshed with the fixed gear, and a translation gear coaxial with the end face gear. The translation gear meshes with the internal teeth of the internal gear ring of the cleaning mechanism. Gear shafts of the main gear and the fixed gear are arranged horizontally, and gear shafts of the end face gear and the translation gear are arranged vertically. A gear shaft of the deflection gear is provided horizontally. The flexible rack or toothed chain meshes with the main gear. An end of the flexible rack or toothed chain connected to the counterweight around the main gear is connected to the counterweight after winding around the deflection gear. The gear shafts of the main gear, the fixed gear, the deflection gear, the end face gear, and the translation gear are arranged on the gear box. The gear set and the gear box are arranged at the upper end of the sleeve.

At the beginning of fountaining, the water flow enters from the water inlet hole into the inner chamber where the power slider is located. Under the combined action of the counterweight and the impact of the water flow, the power slider slides from the bottom to the top in the inner chamber. During the sliding of the power slider, the flexible rack or toothed chain drives the main gear to rotate, and the main gear drives the fixed gear to rotate. The fixed gear meshes with the end face gear and drives the end face gear to rotate horizontally. The end face gear drives the translation gear to rotate horizontally. The horizontally rotating translation gear drives the internal gear ring to rotate on the ring cover of the central hole pressing ring, thereby driving the scrapers to clean algae and other dirt on the surface of the light body. The flexible rack or toothed chain winds around the main gear and is connected to the counterweight through the deflection gear. Due to the combined force of the pull force generated by the gravity of the counterweight and the impact force of the water flow on the power slider, the power slider slides along the sleeve from the bottom of the sleeve for a distance equal to a length of the inner chamber where the power slider is located. Meanwhile, a gear ratio of the fixed gear to the end face gear is adjusted to ensure that the scrapers scrape at least one circle on the surface of the light body. During fountaining, the power slider is at the upper end of the sleeve, and the counterweight is at the lower end of the sleeve. At the end of fountaining, since the weight of the power slider is greater than the weight of the counterweight, the power slider pulls the counterweight upward through the transmission mechanism, the power slider falls to the lower end of the sleeve, and the counterweight is at the upper end of the sleeve. During this process, the transmission mechanism drives the scrapers to rotate reversely at least one circle; in this way, the surface of the light body is cleaned at the beginning and end of fountaining.

The sleeve is directly provided at the periphery of the nozzle, and the driving mechanism is provided therein. The power source of the driving mechanism comes from the pressure of the water flow injected at the bottom of the nozzle. The design directly solves the power source problem, avoids the use of the external power supply, and realizes a simple and convenient structure. In the present disclosure, the driving mechanism adopts the power slider and the counterweight. The gravity of the counterweight and the power slider is combined with a small amount of water impact to form the power source with a simple structure. The design realizes a simple and compact structure and is easy to use. The scrapers arranged on the cleaning mechanism can effectively remove the algae and other dirt on the LED fountain light. By matching the number of gears with the gear rings of the transmission mechanism, the scrapers scrape for more than one circle every time the power slider completes a stroke. At the beginning of fountaining, the power slider moves upward to the top of the sleeve. Under the combined action of the water flow impact and the counterweight, the power slider is still at the top of the sleeve. The scrapers no longer work, thereby preventing the scrapers from scratching the surface of the LED fountain light. At the end of fountaining, because the weight of the power slider is greater than the weight of the counterweight, the power slider, and the counterweight drive the transmission mechanism. In this way, the scrapers are driven to rotate reversely to scrape off the algae and other dirt on the surface of the LED fountain light. The scrapers can also scrape for at least one circle and avoid scratching the LED fountain light. In addition, the design realizes the forward and backward rotation of the scrapers to clean the surface of the LED fountain light thoroughly. The scrapers are provided between the LED light beads. When the scrapers stop rotating, they also stop between the LED light beads, thereby preventing the scrapers and the scraper supports from affecting the projection of the color light of the LED light bead.

Further, a horizontally rotating transmission gear meshes between the translation gear and the internal gear ring, and a gear shaft of the transmission gear is vertically fixed on the gear box. Through the transmission gear, the running of the whole transmission mechanism is more stable. Of course, in the present disclosure, the transmission gear may not be provided. Instead, the translation gear directly meshes with the internal gear ring.

Further, the power slider is provided in the inner chamber, and the counterweight is provided in the outer chamber. This design facilitates the settings of the transmission mechanism and the bottom water flow.

Further, the cross sections of the inner chamber and the outer chamber are circular, and the power slider and the counterweight are also circular. This design ensures more stable force transmission and makes it more convenient to mount the whole driving mechanism.

Further, the top ends of the inner chamber and the outer chamber are sealed by a sealing cover, and the upper ends of the inner chamber and the outer chamber are provided with multiple connecting holes that provide communication between the inner chamber with the outer chamber. A resistance liquid is provided in the inner chamber and the outer chamber that are communicated with each other, and a flow rate of the resistance liquid is controlled through the connecting holes, thereby controlling the sliding speed of the power slider and the counterweight.

A simple resistance device is formed in the inner chamber and the outer chamber through the sealing cover, the connecting holes, and the resistance liquid on and in the inner chamber and the outer chamber. This prevents the power slider from rushing to the top of the inner chamber under the impact of the water flow and ensures the smooth transmission of the transmission mechanism to ensure that the scrapers can stably scrape off algae and other dirt.

Further, the sealing cover is provided with through holes through which the flexible rack or toothed chain passes. The inner chamber and the outer chamber are respectively provided with flexible sleeves that wrap and seal the flexible rack or toothed chain, and the flexible sleeves have top ends communicated with the through holes respectively and bottom ends sealed and fixed on the power slider and the counterweight respectively. The flexible sleeve is sleeved on the flexible rack or toothed chain, and the flexible sleeve is matched with the through hole to prevent the flexible rack or toothed chain from being contaminated with the resistance liquid and prevent the air above the resistance liquid from leaking to reduce the resistance effect.

Further, the sealing cover is provided with buffer springs, which are sleeved on the flexible rack or toothed chain at the inner tops of the inner chamber and the outer chamber, respectively. The buffer springs sleeved on the flexible sleeves are arranged at a lower surface of the sealing cover, which can prevent the power slider or counterweight from bumping.

Further, the transmission mechanism includes a tensioning gear, which is provided between the main gear and the power slider and is hinged to an inner wall at the upper end of the sleeve through a connecting rod, and a support spring for supporting the tensioning gear is provided below the connecting rod. The tensioning gear and the support spring can tension the flexible rack or toothed chain, ensuring the stability of power transmission.

Further, the cleaning mechanism includes a pressing structure, which includes a pressing post provided at the free end of each of the scraper supports and a pressing ring suspended under the pressing post. The pressing post presses the pressing ring on the upper surface of the scraper support through a pressing spring, and the pressing post is fixed to the light housing. The pressing post may be annular and there may be multiple pressing posts as long as the pressing ring is pressed on the scraper support to prevent the scraper from losing contact with the scraper support. If there are multiple pressing posts, there are three pressing posts that are uniformly and circumferentially arranged at the periphery of the lens.

Further, there are at least four scrapers. The scrapers cooperate with the stroke of the power slider to effectively remove algae and other dirt on the surface of the LED fountain light.

Further, the nozzle has a gradually narrowed top. The nozzle is effectively separated from the driving mechanism and the transmission mechanism to avoid mutual interference.

The principles of the present disclosure are as follows. The driving mechanism of the LED fountain light is provided between the central hole pressing ring and the nozzle, and the transmission mechanism and the cleaning mechanism are respectively arranged on the surface of the LED fountain light. At the beginning of fountaining, water enters from the water inlet hole at the bottom of the inner chamber and impacts the power slider. Under the action of the resistance from the resistance liquid in the inner chamber, the impact force of the water flow, the gravity of the power slider, and the pull force of the counterweight, the power slider moves upward. In this process, the sum of the pull force of the counterweight and the impact force of the water flow is greater than the gravity of the resistance liquid in the inner chamber and the power slider, and the power slider naturally rises. During the rising process of the power slider, the resistance liquid in the inner chamber is gradually injected into the upper part of the counterweight in the outer chamber through the connecting holes. The resistance liquid mainly acts as a buffer to ensure the smooth movement of the power slider. When the power slider slides to the upper end of the inner chamber and stops, the resistance liquid is poured into the top of the counterweight in the outer chamber. In the present disclosure, the weight of the power slider is greater than the sum of the weight of the resistance liquid and the counterweight. At the end of fountaining, the power slider pulls the counterweight and the resistance liquid in the outer chamber upward under its gravity. The resistance liquid is gradually poured into the power slider in the inner chamber. In this way, the counterweight is located at the upper end of the outer chamber, and the resistance liquid and power slider are located at the bottom of the inner chamber. The sum of the weight of the power slider and the weight of the resistance liquid is far greater than the weight of the counterweight, so the power slider and the counterweight are in a static state. Each time the fountaining is started and stopped, the counterweight and the power slider make a round-trip movement once in the outer chamber and the inner chamber respectively and drive the scrapers forward and backward to clean the LED fountain light once. The design realizes a simple and reasonable structure.

In the present disclosure, the scrapers are rotated forward and backward once to effectively clean the algae and other dirt on the surface of the LED fountain light. The present disclosure realizes a simple and compact structure and can limit the rotation times of the scrapers to prevent the scrapers from scratching the surface of the LED fountain light.

BRIEF DESCRIPTION OF THE DRAWINGS

The present disclosure is further described below with reference to the drawings and specific embodiments.

Figure 1:
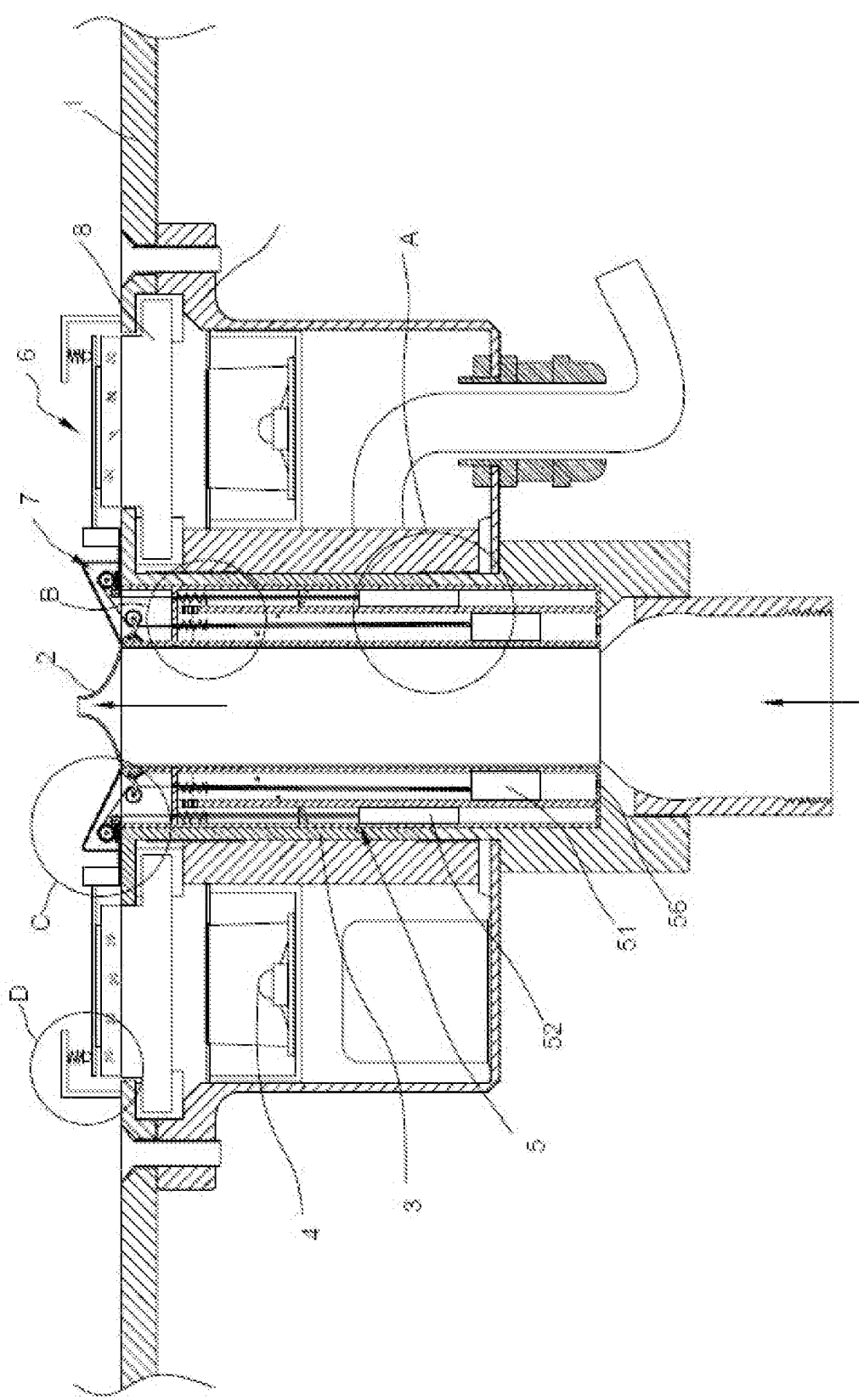
FIG. 1 is a structural view of an LED fountain light according to an embodiment of the present disclosure.

Reference Numerals: 1. Light housing; 2. nozzle; 3. Central hole pressing ring; 31. ring cover; 4. LED light bead; 5. Driving mechanism; 51. power slider; 52. Counterweight; 53. inner chamber; 54. Outer chamber; 55. toothed chain; 56. Water inlet hole; 57. sealing cover; 58. Connecting hole; 59. Resistance liquid; 510. Flexible sleeve; 511. Buffer spring; 512. Through hole; 6. Cleaning mechanism; 61. Scraper; 62. Scraper support; 63. Scraper holder; 64. Internal gear ring; 65. Pressing structure; 651. Pressing post; 652. Pressing ring; 653. Pressing spring; 7. Transmission mechanism; 71. Gear box; 72. Main gear; 73. Fixed gear; 74. Deflection gear; 75. End face gear; 76. Translation gear; 77. Tensioning gear; 78. Connecting rod; 79. Support spring; 710. Transmission gear; and 8. Lens.

DETAILED DESCRIPTION OF THE EMBODIMENTS

The present disclosure is described in further detail below with reference to the drawings and a non-limiting embodiment. However, it should be understood that the description is exemplary and is not limited to the scope of the present disclosure. In addition, in the following description, descriptions of conventional structures and technologies are omitted to avoid unnecessarily confusing the concepts of the present disclosure.

Embodiment

As shown in FIG. 1, an LED fountain light with self-cleaning lens 8 includes a light body with a central hole, light housing 1 surrounding the light body, nozzle 2 provided in the light housing 1 and located in the central hole, central hole pressing ring 3 sleeved in the central hole, LED light beads 4 arranged between the central hole pressing ring 3 and the light housing 1 and sealed by a sealant, driving mechanism 5 provided between the nozzle 2 and the central hole pressing ring 3, cleaning mechanism 6 provided on a surface of the light body to scrape off algae and other dirt, and transmission mechanism 7 provided between the driving mechanism 5 and the cleaning mechanism 6. The LED light beads 4 are annularly arranged around the central hole. The lens 8 is annularly provided above an upper surface of each of the LED light beads 4.

Figure 2:
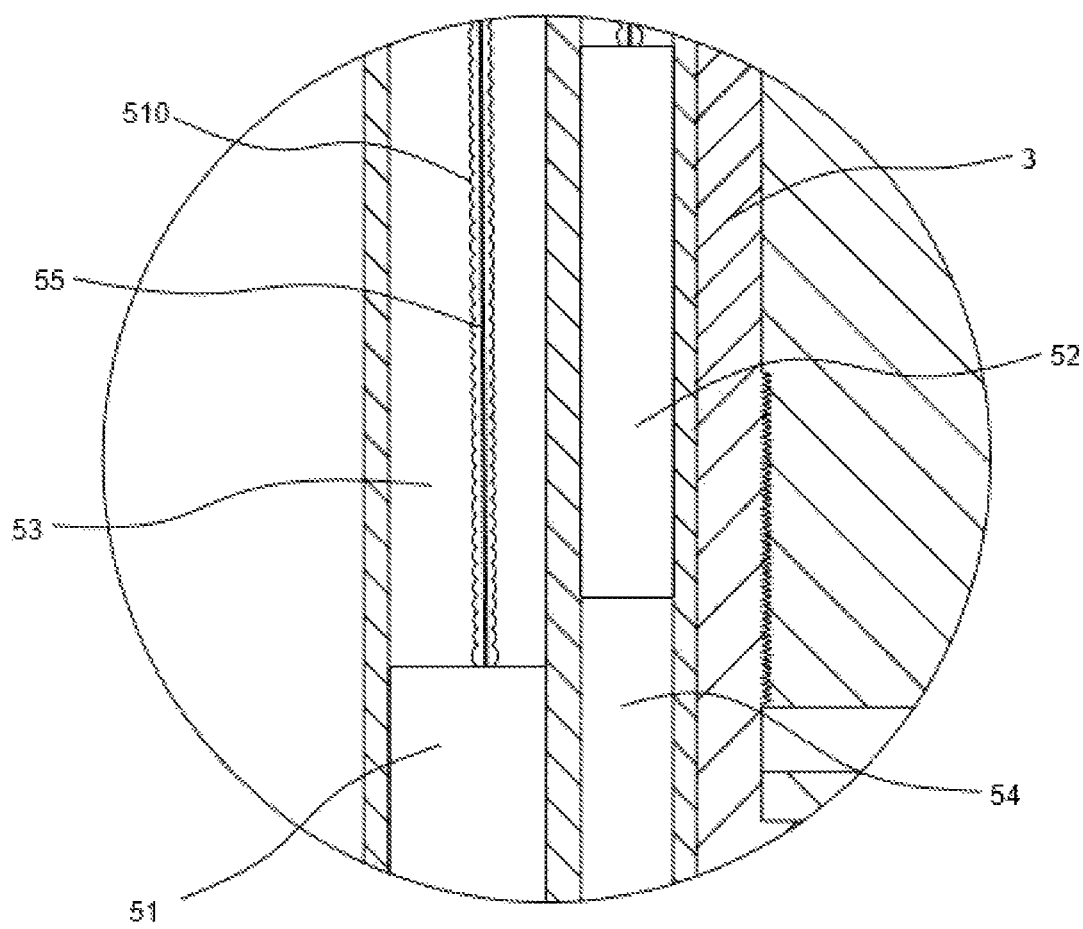
FIG. 2 is an enlarged view of A shown in FIG. 1.
Figure 3:
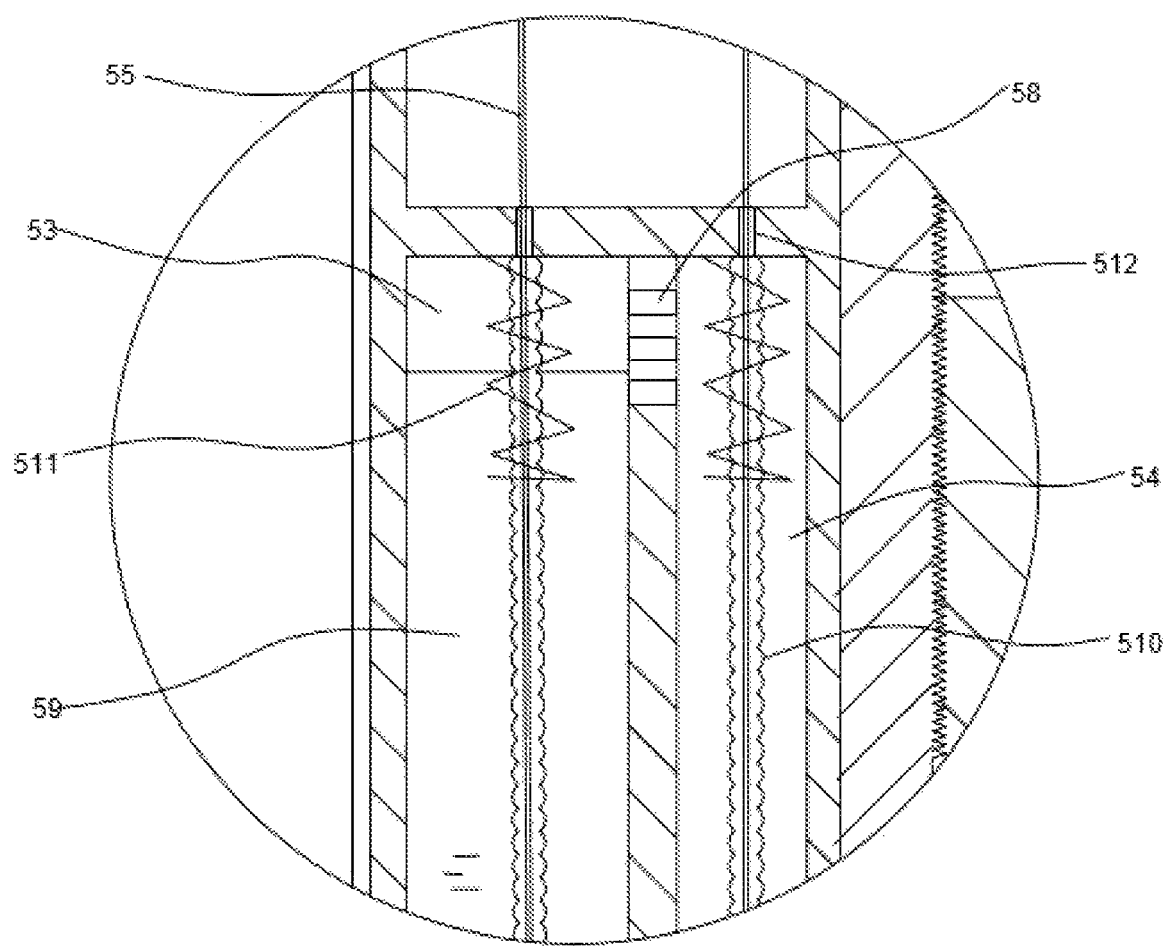
FIG. 3 is an enlarged view of B shown in FIG. 1.

As shown in FIGS. 1, 2, and 3, the driving mechanism 5 includes a sleeve fixedly provided between the nozzle 2 and the central hole pressing ring 3, power slider 51 provided in the sleeve and slidable up and down, and counterweight 52 provided in the sleeve and cooperating with the power slider 51. The sleeve is longitudinally divided into inner chamber 53 adjacent to the central hole and outer chamber 54 adjacent to the central hole pressing ring 3. The power slider 51 and the counterweight 52 are respectively arranged in the inner chamber 53 and the outer chamber 54. The power slider 51 and the counterweight 52 are connected through toothed chain 55. The power slider 51 has a weight greater than the weight of the counterweight 52. The bottom of the inner chamber where the power slider 51 is located is provided with water inlet hole 56 for injecting a high-pressure water flow.

As shown in FIGS. 1, 6, 7, and 8, the central hole pressing ring 3 is provided with ring cover 31 at the top of the central hole. The cleaning mechanism 6 includes multiple scrapers 61 arranged on the surface of the light body to scrape off algae and other dirt, multiple scraper supports 62 configured to fix the scrapers 61, multiple scraper holders 63 configured to fix the scraper supports 62, and rotatable internal gear ring 64 provided on the ring cover 31. The internal gear ring 64 is coaxial with the central hole pressing ring 3. The multiple scraper holders 63 are uniformly arranged in an array on the upper surface of the internal gear ring 64. The scrapers 61 are provided along a radial direction of the lens 8.

Figure 4:
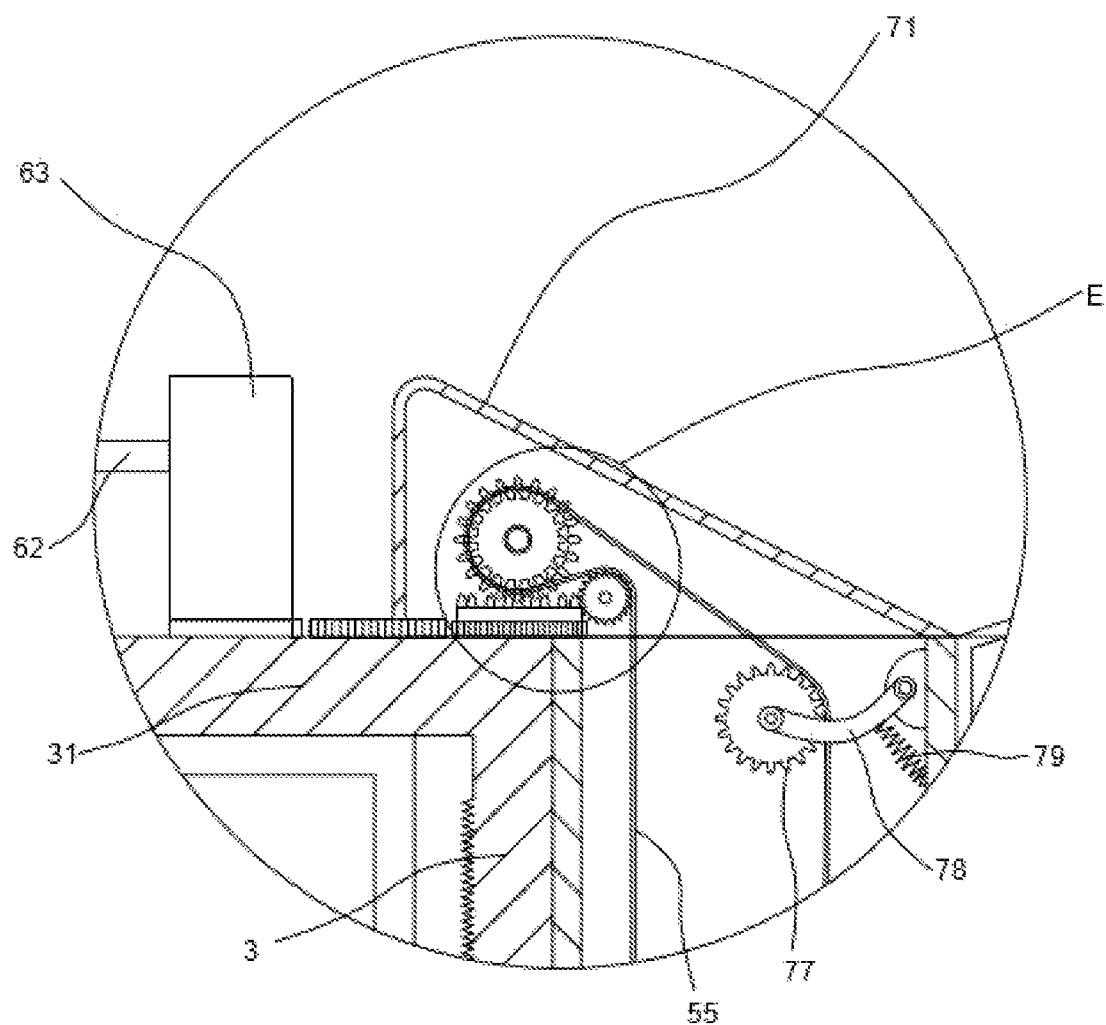
FIG. 4 is an enlarged view of C shown in FIG. 1.
Figure 5:
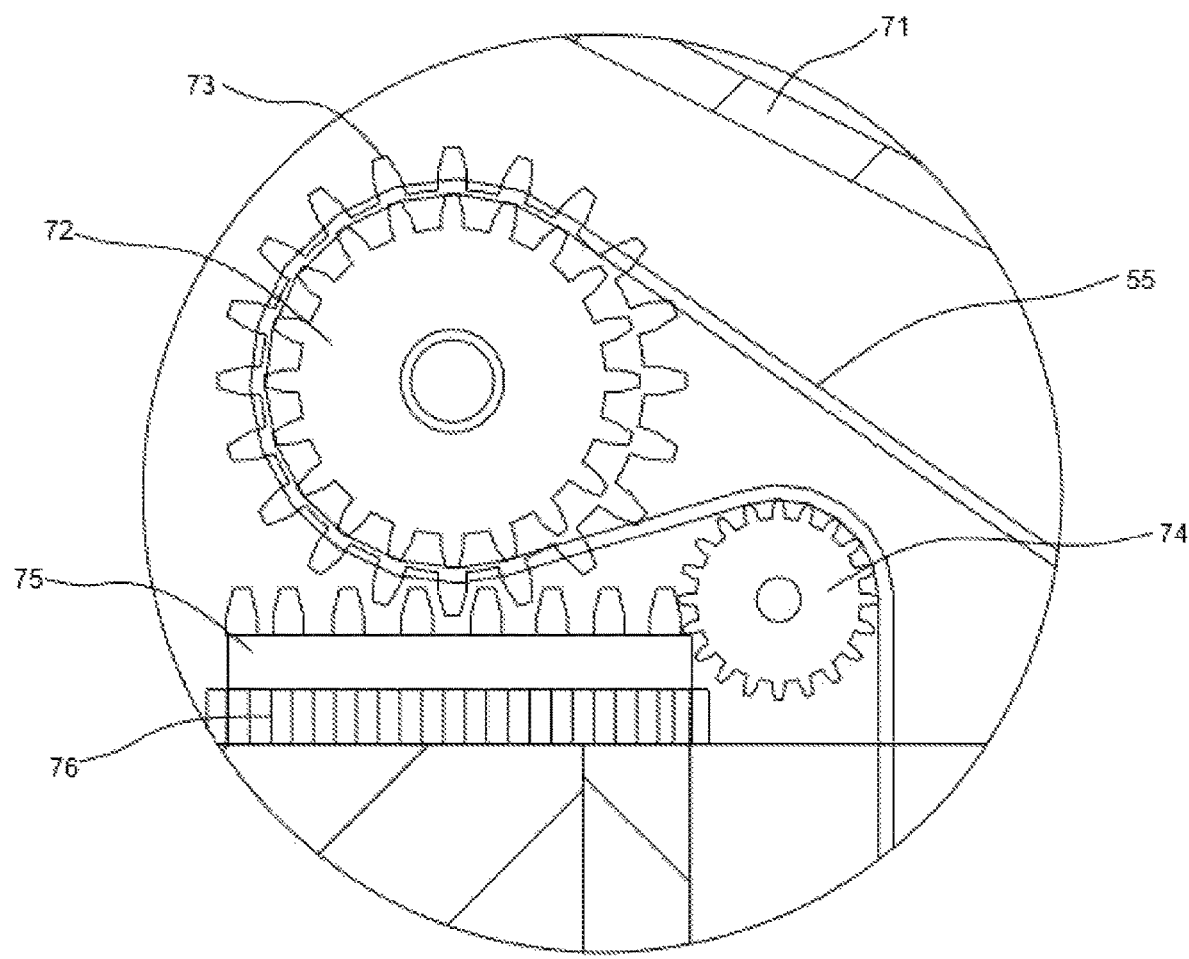
FIG. 5 is an enlarged view of E shown in FIG. 4.
Figure 6:
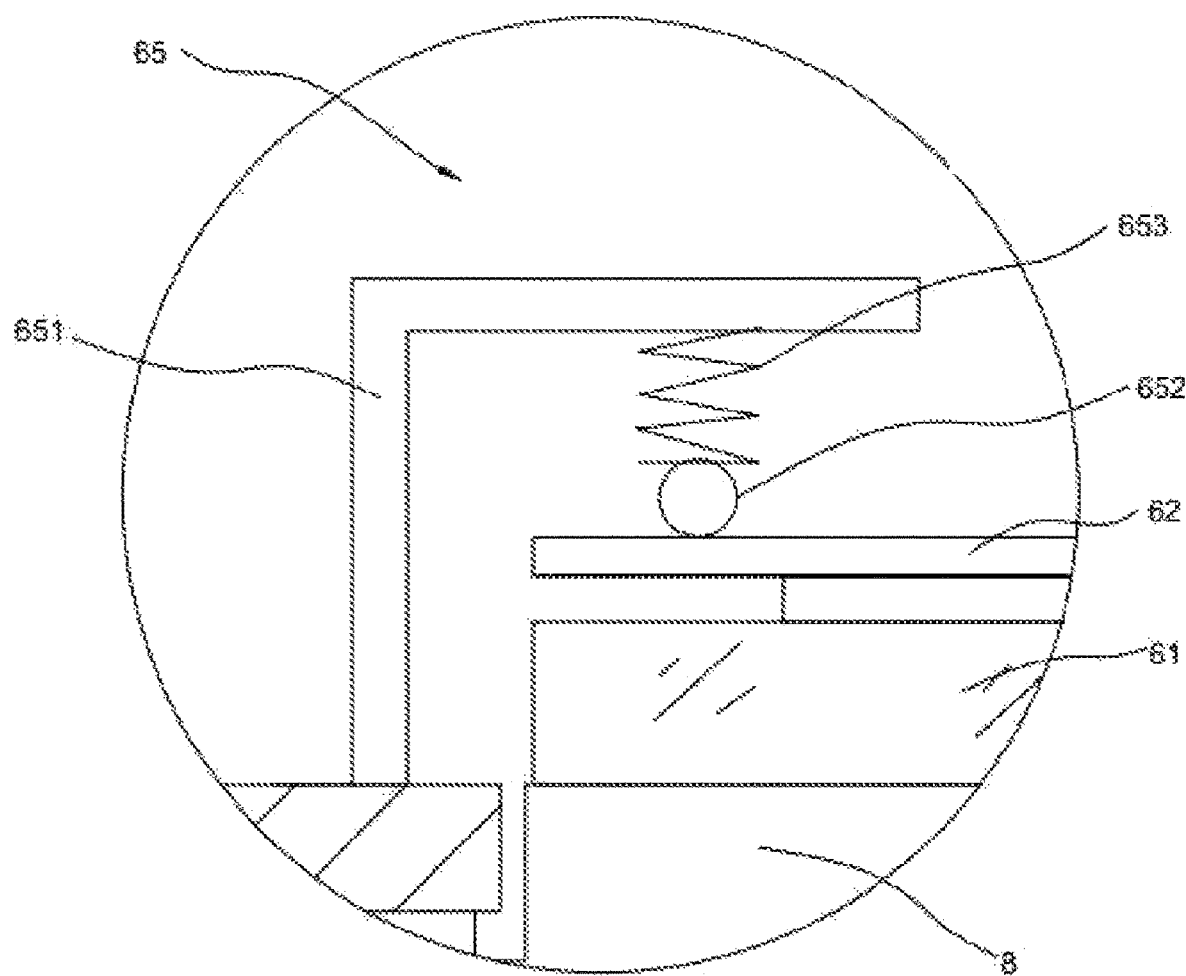
FIG. 6 is an enlarged view of D shown in FIG. 1.
Figure 7:
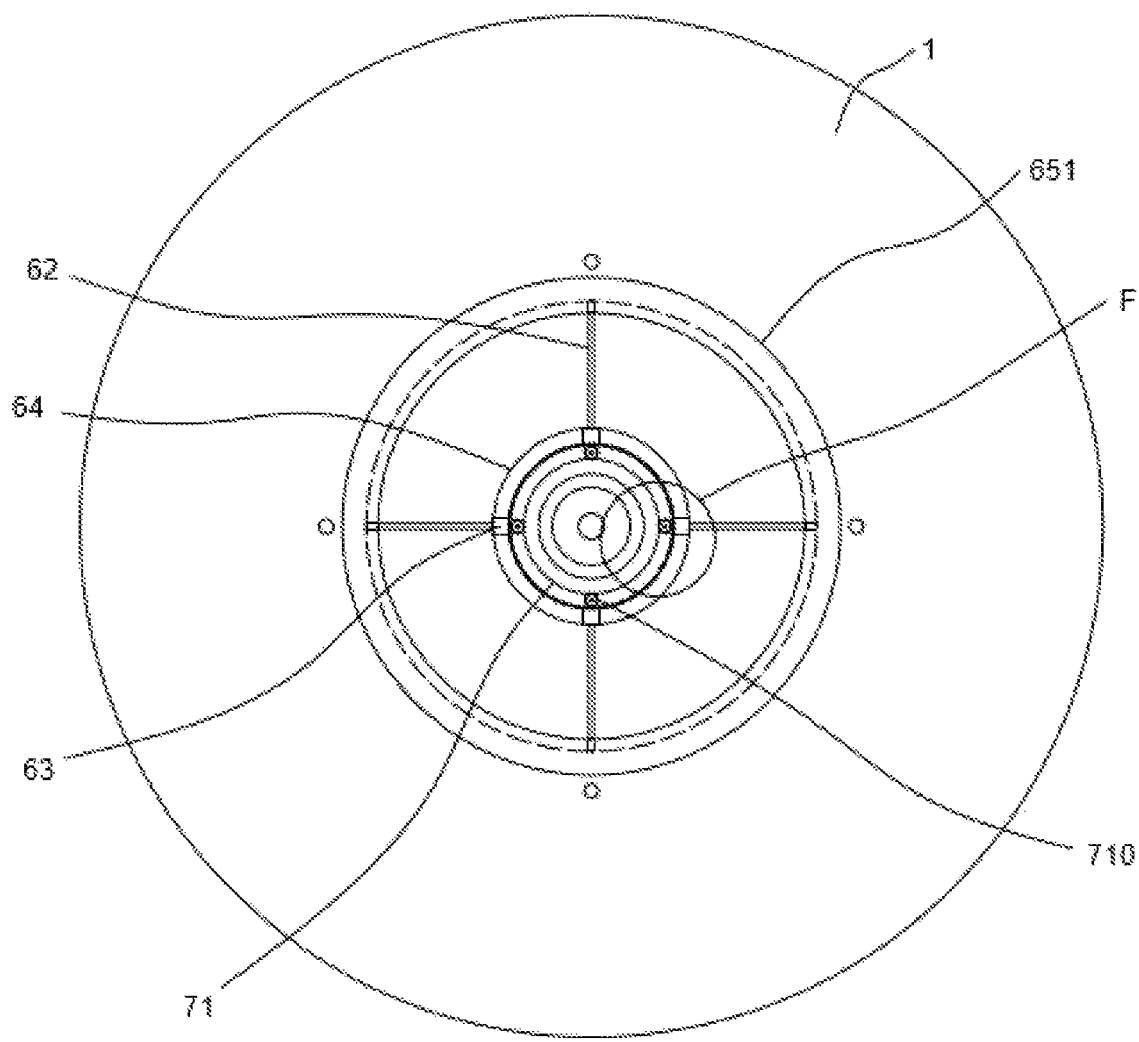
FIG. 7 is a top view of the LED fountain light shown in FIG. 1.
Figure 8:
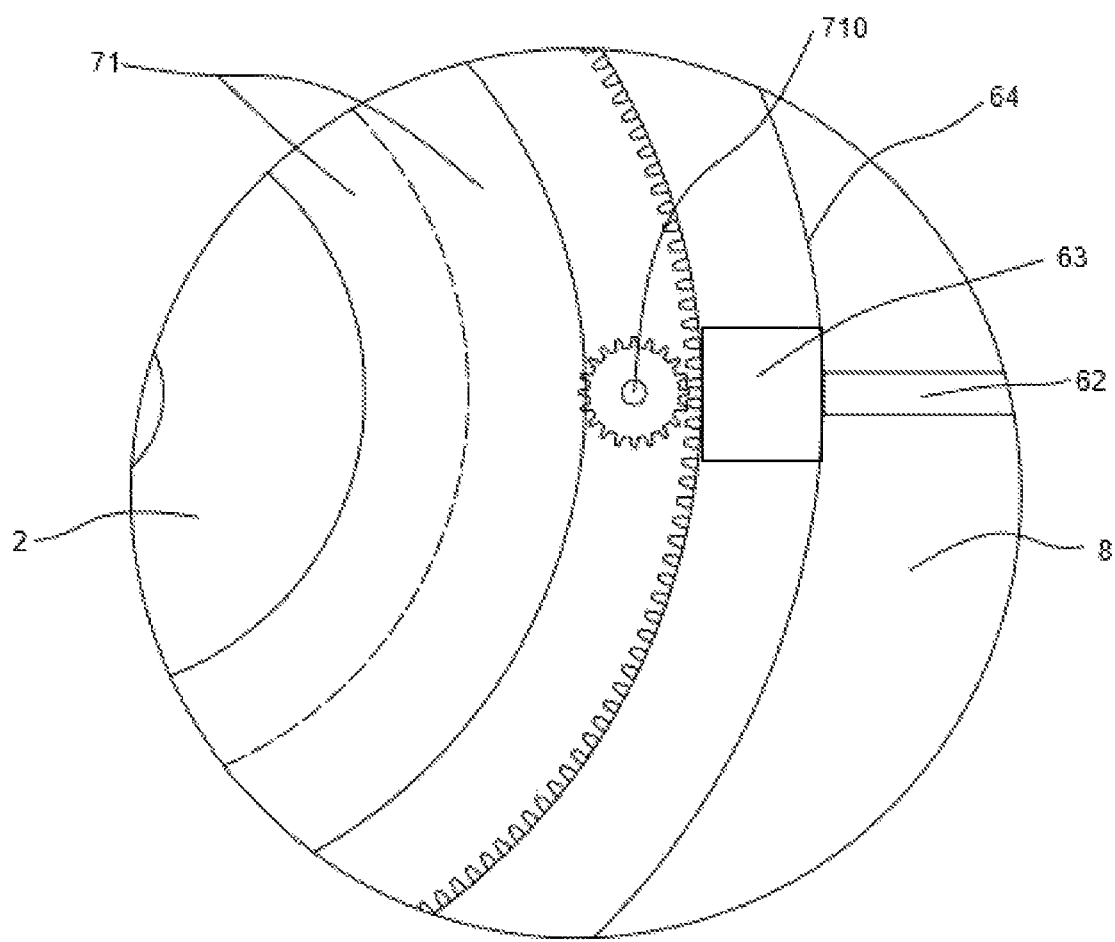
FIG. 8 is an enlarged view of F shown in FIG. 7.

As shown in FIGS. 1, 4, and 5, the transmission mechanism 7 is composed of a gear set and gear box 71. The gear set includes main gear 72, fixed gear 73 coaxial with the main gear 72, deflection gear 74, end face gear 75 meshed with the fixed gear 73, and translation gear 76 coaxial with the end face gear 75. The translation gear 76 meshes with the internal teeth of the internal gear ring 64 of the cleaning mechanism 6. Gear shafts of the main gear 72 and the fixed gear 73 are arranged horizontally, and gear shafts of the end face gear 75 and the translation gear 76 are arranged vertically. A gear shaft of the deflection gear 74 is provided horizontally. The toothed chain 55 meshes with the main gear 72, and an end of the toothed chain connected to the counterweight 52 around the main gear 72 is connected to the counterweight 52 after winding around the deflection gear 74. The gear shafts of the main gear 72, the fixed gear 73, the deflection gear 74, the end face gear 75, and the translation gear 76 are arranged on the gear box 71. The gear set and the gear box 71 are arranged at the upper end of the sleeve.

At the beginning of fountaining, the water flow enters from the water inlet hole 56 into the inner chamber where the power slider 51 is located. Under the combined action of the counterweight 52 and the impact of water flow, the power slider 51 slides from bottom to top in the inner chamber. During the sliding of the power slider, the toothed chain 55 drives the main gear 72 to rotate, and the main gear 72 drives the fixed gear 73 to rotate. The fixed gear 73 meshes with the end face gear 75 and drives the end face gear 75 to rotate horizontally. The end face gear 75 drives the translation gear 76 to rotate horizontally. The horizontally rotating translation gear 76 drives the internal gear ring 64 to rotate on the ring cover 31 of the central hole pressing ring 3, thereby driving the scrapers 61 to clean algae and other dirt on the surface of the light body. The toothed chain 55 winds around the main gear 72 and is connected to the counterweight 52 through the deflection gear 74. Due to the combined force of a pull force generated by the gravity of the counterweight 52 and an impact force of the water flow on the power slider 51, the power slider 51 slides along the sleeve from the bottom of the sleeve for a distance equal to a length of the inner chamber where the power slider 51 is located. Meanwhile, a gear ratio of the fixed gear 73 to the end face gear 75 is adjusted to ensure that the scrapers 61 scrape at least one circle on the surface of the light body. During fountaining, the power slider 51 is at the upper end of the sleeve, and the counterweight 52 is at the lower end of the sleeve. At the end of fountaining, since the weight of the power slider 51 is greater than the weight of the counterweight 52, the power slider 51 pulls the counterweight 52 upward through the transmission mechanism 7. The power slider 51 falls to the lower end of the sleeve, and the counterweight 52 is at the upper end of the sleeve. During this process, the transmission mechanism 7 drives the scrapers 61 to rotate at least one circle. In this way, the surface of the light body is cleaned at the beginning and end of fountaining.

Horizontally rotating transmission gear 710 further meshes between the translation gear 76 and the internal gear ring 64. A gear shaft of the transmission gear 710 is vertically fixed on the gear box 71. The power slider 51 is provided in the inner chamber 53, and the counterweight 52 is provided in the outer chamber 54. The cross sections of the inner chamber 53 and the outer chamber 54 are circular, and the power slider 51 and the counterweight 52 are also circular. The top ends of the inner chamber 53 and the outer chamber 54 are sealed by a sealing cover 57, and the upper ends of the inner chamber 53 and the outer chamber 54 are provided with multiple connecting holes 58 that provide communication between the inner chamber and the outer chamber. A resistance liquid 59 is provided in the inner chamber and the outer chamber that are communicated with each other. A flow rate of the resistance liquid 59 is controlled through the connecting holes 58, thereby controlling the sliding speed of the power slider 51 and the counterweight 52. The sealing cover 57 is provided with through holes 512 through which the toothed chain 55 passes. The inner chamber 53 and the outer chamber 54 are respectively provided with flexible sleeves 510 that wrap and seal the toothed chain 55. The flexible sleeves 510 have top ends communicated with the through holes 512 respectively and bottom ends sealed and fixed on the power slider 51 and the counterweight 52 respectively. The sealing cover 57 is provided with buffer springs 511, which are sleeved on the toothed chain 55 at the inner tops of the inner chamber 53 and the outer chamber 54, respectively. The transmission mechanism 7 further includes tensioning gear 77. The tensioning gear 77 is provided between the main gear 72 and the power slider 51. The tensioning gear 77 is hinged to the inner wall at the upper end of the sleeve through connecting rod 78, and support spring 79 for supporting the tensioning gear 77 is provided below the connecting rod 78. The cleaning mechanism 6 further includes pressing structure 65. The pressing structure 65 includes pressing post 651 provided at the free end of each of the scraper supports 62 and pressing ring 652 suspended under the pressing post 651. The pressing post 651 presses the pressing ring 652 on the upper surface of the scraper support 62 through a pressing spring 653. The pressing post 651 is fixed to the light housing 1. There are four scrapers 61. The nozzle 2 has a gradually narrowed top.

The power source of the driving mechanism 5 comes from the pressure of the water flow injected at the bottom of the nozzle 2. The design directly solves the power source problem and avoids the use of an external power supply. In this embodiment, the driving mechanism 5 adopts the power slider 51 and the counterweight 52. The gravity of the counterweight 52 and the power slider 51 is combined with the impact from a small amount of water to form the power source. The scrapers 61 arranged on the cleaning mechanism 6 can effectively remove the algae and other dirt on the LED fountain light. By matching the number of gears with the gear rings of the transmission mechanism 7, the scrapers 61 scrape more than one circle every time the power slider 51 completes a stroke. At the beginning of fountaining, the power slider 51 moves upward to the top of the sleeve. Under the combined action of the water flow impact and the counterweight 52, the power slider 51 is still at the top of the sleeve. The scrapers 61 no longer work, thereby preventing the scrapers 61 from scratching the surface of the LED fountain light. At the end of fountaining, because the weight of the power slider 51 is greater than the weight of the counterweight 52, the power slider 51 and the counterweight 52 drive the transmission mechanism 7. In this way, the scrapers 61 are driven to rotate reversely to scrape off the algae and other dirt on the surface of the LED fountain light. The design realizes the forward and backward rotation of the scrapers 61 to clean the surface of the LED fountain light thoroughly. The scrapers 61 are provided between the LED light beads 4. When the scrapers 61 stop rotating, they also stop between the LED light beads 4, thereby preventing the scrapers 61 and the scraper supports 62 from affecting the projection of the color light of the LED light bead 4. In this embodiment, the pressure of the water flow sprayed into the water inlet hole 56, the gravity of the power slider 51, the resistance of the resistance liquid 59, and the gravity of the counterweight 52 cooperate to achieve the self-cleaning function of the LED fountain light.

The above are merely the embodiments of the present disclosure. Common knowledge such as well-known specific structures and characteristics in the solution is not detailed herein. Those skilled in the art should know all the common technical knowledge in the technical field to which the present disclosure belongs before the filing date or the priority date and have the ability to apply conventional experimental means before the date. Those skilled in the art can improve and implement this solution in combination with their abilities under the inspiration given in the present disclosure. Some typical well-known structures or well-known methods should not be an obstacle for those skilled in the art to practice the present disclosure. It should be noted that those skilled in the art may further make several variations and improvements without departing from the scope of the present disclosure, and such variations and improvements should also be deemed as falling within the protection scope of the present disclosure without affecting the implementation effect and practicability of the patent.

It should be understood that in the description of the present disclosure, terms such as "central", "longitudinal", "transverse" "upper", "lower", "front", "rear", "left", "right" "vertical", "horizontal", "top", "bottom", "inside", and "outside" indicate the orientation or positional relationships based on the drawings. They are merely intended to facilitate and simplify the description of the present disclosure, rather than to indicate or imply that the mentioned device or components must have a specific orientation or must be constructed and operated in a specific orientation. Therefore, these terms should not be construed as a limitation to the present disclosure. Moreover, the terms such as "first" and "second" are used only for the purpose of description and cannot be understood as indicating or implying relative importance or implicitly indicating the number of technical features denoted. Thus, features defined with "first" and "second" may explicitly or implicitly include one or more of the features. In the description of the present disclosure, unless otherwise specified, "a plurality of" means at least two.

In the description of the present disclosure, it should be noted that, unless otherwise clearly specified and defined, meanings of the terms "install", "connect with", and "connect to" should be understood in a broad sense. For example, the connection may be a fixed connection, a detachable connection, or an integral connection; a mechanical connection or an electrical connection; a direct connection or an indirect connection with the use of an intermediate medium; or intercommunication between two components. A person of ordinary skill in the art may understand specific meanings of the above terms in the present disclosure based on a specific situation.

What is claimed is:

1. A light-emitting (LED) fountain light with a self-cleaning lens, comprising:
   a light body with a central hole,
   a light housing surrounding the light body,
   a nozzle provided in the light housing and located in the central hole,
   a central hole pressing ring sleeved in the central hole,
   LED light beads arranged between the central hole pressing ring and the light housing and sealed by a sealant,
   a driving mechanism provided between the nozzle and the central hole pressing ring,
   a cleaning mechanism provided on a surface of the light body to scrape off algae and a dirt, and
   a transmission mechanism provided between the driving mechanism and the cleaning mechanism, wherein
   the LED light beads are annularly arranged around the central hole; and the self-cleaning lens is annularly provided above an upper surface of each of the LED light beads;
   the driving mechanism comprises:
      a sleeve fixedly provided between the nozzle and the central hole pressing ring,
      a power slider provided in the sleeve and slidable up and down, and
      a counterweight provided in the sleeve and cooperating with the power slider; wherein
      the sleeve is longitudinally divided into an inner chamber adjacent to the central hole and an outer chamber adjacent to the central hole pressing ring;
      the power slider and the counterweight are respectively arranged in the inner chamber and the outer chamber;
      the power slider and the counterweight are connected through a flexible rack or toothed chain;
      a weight of the power slider is greater than a weight of the counterweight; and
      a bottom of the inner chamber is provided with a water inlet hole for injecting a high-pressure water flow;
   the central hole pressing ring is provided with a ring cover at a top of the central hole;
   the cleaning mechanism comprises:
      a plurality of scrapers arranged on the surface of the light body to scrape off the algae and the dirt,
      a plurality of scraper supports configured to fix the plurality of scrapers respectively,
      a plurality of scraper holders configured to fix the plurality of scraper supports, and
      an internal gear ring provided on the ring cover and configured to rotate; wherein
      the internal gear ring is coaxial with the central hole pressing ring;
      the plurality of scraper holders are uniformly arranged in an array on an upper surface of the internal gear ring; and
      the plurality of scrapers is provided along a radial direction of the self-cleaning lens;
   the transmission mechanism comprises a gear set and a gear box; wherein
   the gear set comprises:
      a main gear,
      a fixed gear coaxial with the main gear,
      a deflection gear,
      an end face gear meshed with the fixed gear, and a translation gear coaxial with the end face gear; wherein the translation gear meshes with internal teeth of the internal gear ring of the cleaning mechanism;

a gear shaft of the main gear and a gear shaft of the fixed gear are arranged horizontally, and a gear shaft of the end face gear and a gear shaft of the translation gear are arranged vertically;

a gear shaft of the deflection gear is provided horizontally;

the flexible rack or toothed chain meshes with the main gear;

after an end of the flexible rack or toothed chain winds around the main gear and is connected to the counterweight, the end of the flexible rack or toothed chain winds around the deflection gear and then is connected to the counterweight;

the gear shaft of the main gear, the gear shaft of the fixed gear, the gear shaft of the deflection gear, the gear shaft of the end face gear, and the gear shaft of the translation gear are arranged on the gear box; and the gear set and the gear box are arranged at an upper end of the sleeve;

at a beginning of a fountaining, a water flow enters from the water inlet hole into the inner chamber; under a combined action of the counterweight and an impact of the water flow, the power slider slides from bottom to top in the inner chamber; during sliding of the power slider, the flexible rack or toothed chain drives the main gear to rotate, and the main gear drives the fixed gear to rotate; the fixed gear meshes with the end face gear and drives the end face gear to rotate horizontally; the end face gear drives the translation gear to rotate horizontally; the translation gear drives the internal gear ring to rotate on the ring cover of the central hole pressing ring, thereby driving the plurality of scrapers to clean the algae and the dirt on the surface of the light body; the flexible rack or toothed chain winds around the main gear and is connected to the counterweight through the deflection gear; due to a combined force of a pull force generated by a gravity of the counterweight and an impact force of the water flow on the power slider, the power slider slides along the sleeve from a bottom of the sleeve for a distance equal to a length of the inner chamber; meanwhile, a gear ratio of the fixed gear to the end face gear is adjusted to ensure that the plurality of scrapers scrape at least one circle on the surface of the light body; during the fountaining, the power slider is at the upper end of the sleeve, and the counterweight is at a lower end of the sleeve; at an end of the fountaining, since the weight of the power slider is greater than the weight of the counterweight, the power slider pulls the counterweight upward through the transmission mechanism; the power slider falls to the lower end of the sleeve, and the counterweight is at the upper end of the sleeve; during this process, the transmission mechanism drives the plurality of scrapers to rotate reversely at least one circle, so the surface of the light body is cleaned at the beginning and the end of the fountaining.

2. The LED fountain light with the self-cleaning lens according to claim 1, wherein a transmission gear further meshes between the translation gear and the internal gear ring, and the transmission gear rotates horizontally; and a gear shaft of the transmission gear is vertically fixed on the gear box.

3. The LED fountain light with the self-cleaning lens according to claim 1, wherein the power slider is provided in the inner chamber, and the counterweight is provided in the outer chamber.

4. The LED fountain light with the self-cleaning lens according to claim 1, wherein cross sections of the inner chamber and the outer chamber are circular, and the power slider and the counterweight are also circular.

5. The LED fountain light with the self-cleaning lens according to claim 1, wherein upper ends of the inner chamber and the outer chamber are sealed by a sealing cover, and top ends of the inner chamber and the outer chamber are provided with a plurality of connecting holes, wherein the plurality of connecting holes are in communication with the inner chamber and the outer chamber; a resistance liquid is provided in the inner chamber and the outer chamber, wherein the inner chamber and the outer chamber are in communication with each other; and a flow rate of the resistance liquid is controlled through the plurality of connecting holes, thereby controlling a sliding speed of the power slider and the counterweight.

6. The LED fountain light with the self-cleaning lens according to claim 5, wherein the sealing cover is provided with through holes, and the flexible rack or toothed chain passes through the through holes; the inner chamber and the outer chamber are respectively provided with flexible sleeves, and the flexible sleeves wrap and seal the flexible rack or toothed chain; and top ends of the flexible sleeves are in communication with the through holes, and bottom ends of the flexible sleeves are sealed and fixed on the power slider and the counterweight respectively.

7. The LED fountain light with the self-cleaning lens according to claim 5, wherein the sealing cover at inner tops of the inner chamber and the outer chamber is provided with buffer springs, and the buffer springs are sleeved on the flexible rack or toothed chain respectively.

8. The LED fountain light with h self-cleaning lens according to claim 1, wherein the transmission mechanism further comprises a tensioning gear, and the tensioning gear is provided between the main gear and the power slider and is hinged to an inner wall at the upper end of the sleeve through a connecting rod; and a support spring for supporting the tensioning gear is provided below the connecting rod.

9. The LED fountain light with the self-cleaning lens according to claim 1, wherein the cleaning mechanism further comprises a pressing structure; the pressing structure comprises a pressing post provided at a free end of each of the plurality of scraper supports and a pressing ring suspended under the pressing post; the pressing post presses the pressing ring on an upper surface of the scraper support through a pressing spring; and the pressing post is fixed to the light housing.

10. The LED fountain light with the self-cleaning lens according to claim 1, wherein a number of the plurality of scrapers is at least four.

11. The LED fountain light with the self-cleaning lens according to claim 2, wherein a number of the plurality of scrapers is at least four.

12. The LED fountain light with the self-cleaning lens according to claim 3, wherein a number of the plurality of scrapers is at least four.

13. The LED fountain light with the self-cleaning lens according to claim 4, wherein a number of the plurality of scrapers is at least four.

14. The LED fountain light with the self-cleaning lens according to claim 5, wherein a number of the plurality of scrapers is at least four.

15. The LED fountain light with the self-cleaning lens according to claim 6, wherein a number of the plurality of scrapers is at least four.

16. The LED fountain light with the self-cleaning lens according to claim 7, wherein a number of the plurality of scrapers is at least four.

17. The LED fountain light with the self-cleaning lens according to claim 8, wherein a number of the plurality of scrapers is at least four.

18. The LED fountain light with the self-cleaning lens according to claim 9, wherein a number of the plurality of scrapers is at least four.

\* \* \* \* \*